United States Patent [19]

Smith et al.

[11] Patent Number: 5,471,571
[45] Date of Patent: Nov. 28, 1995

[54] METHOD AND APPARATUS FOR SETTING A GRAPHICAL OBJECT'S POSITION AND ORIENTATION WITH VISCOUS DRAGGING

[75] Inventors: Randall B. Smith; John C. Tang; D. Austin Henderson, Jr., all of Palo Alto, Calif.

[73] Assignee: Xerox Corporation, Stamford, Conn.

[21] Appl. No.: 914,304

[22] Filed: Jul. 17, 1992

Related U.S. Application Data

[63] Continuation-in-part of Ser. No. 813,714, Dec. 27, 1991, abandoned.

[51] Int. Cl.⁶ .................................................. G06F 15/60
[52] U.S. Cl. ........................................................... 395/137
[58] Field of Search ............................ 395/133, 155, 395/159, 137, 161, 155, 136, 138, 139; 345/157, 159, 160, 121, 126

[56] References Cited

U.S. PATENT DOCUMENTS

| | | | |
|---|---|---|---|
| 4,752,828 | 6/1988 | Chapuis et al. | 358/183 |
| 4,811,245 | 3/1989 | Bunker et al. | 364/521 |
| 5,241,655 | 8/1993 | Mineki et al. | 395/156 |

*Primary Examiner*—Phu K. Nguyen
*Attorney, Agent, or Firm*—Kenyon & Kenyon

[57] ABSTRACT

A method and apparatus for using a cursor movement device such as a mouse device to position and orient a graphical object or cursor on a computer screen. The movement and orientation of the graphical object on the screen depends directly upon the path of motion of the cursor. The actual movement of the graphical object is similar to the dragging of an object through a viscous medium. In this manner, a two dimensional object can be moved and rotated on a planar display device with only two directional inputs. Also, the cursor, itself, can be treated as a graphical object. This allows the user to rotate the cursor to a desired orientation. Furthermore, the orientation of the cursor can be used to select one of a plurality of functions performed by the cursor movement device.

43 Claims, 4 Drawing Sheets

METHOD AND APPARATUS FOR SETTING A GRAPHICAL OBJECT'S POSITION AND ORIENTATION WITH VISCOUS DRAGGING

This application is a continuation-in-part of application Ser. No. 07/813,714, filed on Dec. 27, 1991, now abandoned.

BACKGROUND OF THE INVENTION

The present invention relates to an improvement in the movement of graphical images on a computer screen or the like, and in particular to a method for positioning and orienting a graphical object with a cursor movement device using viscous dragging.

In a computer graphics system, one of the more common methods of moving a graphical object on a screen is with a mouse. Unfortunately, a mouse has very limited input capabilities. For example, the standard mouse manufactured by Microsoft® Corporation includes only two directional inputs (i.e., an X and Y direction). In order to position and orient a graphical object, three parameters must be controlled (i.e., two parameters for position and one parameter for orientation). Because the mouse only has two directional inputs, it can only directly control two of the three parameters. This problem escalates in three dimensional graphics where six parameters are to be controlled in order to set position and orientation of an object.

In other computer applications, a cursor is used as an "eraser" or "pencil". In order to change the erasing or writing width of the cursor, a separate input is required from a device such as a keyboard. Also, the number of functions performed by a mouse is limited to its number of input switches.

In both of these applications, the use of a mouse device is made more difficult since extra input is necessary to achieve a desired effect on the screen.

In one previous system, a three-dimensional object's position and orientation is modified by "rolling" the object, as if it was suspended within a sphere, on an imaginary plane. In this system the three-dimensional object is assumed to rest on a horizontal plane. As the cursor is moved, the object is rotated and moved in the direction of the cursor. The path of rolling affects and determines the final orientation of the object. This system allows the user to control five of the six parameters of the object's position and orientation using the two directional inputs of the cursor movement device.

A device known as a "Data Glove" allows the user to change the orientation and placement of a graphical object. However, several inputs are needed from the cursor movement device (i.e., more than three). In a previous Apple® graphics system, the cursor is in the form of a cone in three dimensions. As the cone is moved by the user, it points in the direction of the motion of the cursor and hence the direction of the final segment of the path.

The aforementioned "Data Glove" device requires extra inputs from the cursor movement device in order to move and orient a graphical object. The conic cursor of the Apple® graphics system is somewhat difficult to use when changing the object's orientation. The "rolling sphere" system is not intuitive, making it difficult to control the graphical object's position and orientation at the same time. Also, the "rolling sphere" system does not allow complete control of an object's orientation and position parameters. Accordingly, there is a need for an improved method and apparatus of using cursor control inputs that allows a user to intuitively set the position and orientation of a graphical object. Other desirable features include varying the width of a cursor using only the limited input capabilities of a mouse device or the like, and there is a need for a method and apparatus which increases the functions a cursor movement device can perform.

SUMMARY OF THE INVENTION

These needs are satisfied by the present invention. The computer system for implementing the method of the present invention comprises a central processing unit coupled to a cursor movement device and a display. The cursor movement device can be a mouse, a track-ball device, or the like. The display can be a CRT screen, for instance. Movement of a graphical object on the screen depends on the path of motion of the cursor. The object's movement is achieved according to a hypothetical viscous dragging of the object through an imaginary medium.

Values used in calculating the viscous dragging of the graphical object include the following: the center of mass, the extent of the graphical object, and a plurality of vectors. The first of these vectors points from an arbitrary origin to the center of mass of the object. The second vector points from the origin to the cursor location. It can be assumed that a hypothetical force acts upon the object at the cursor location. The third vector points from the center of mass to the cursor location. The fourth vector represents the orientation of the object measured at the center of mass. The position and orientation of the graphical object are periodically calculated according to the hypothetical viscous dragging method.

The cursor, itself, can be thought of as a graphical object and so be controlled in a like manner. This allows the user to select the orientation of the cursor. In an embodiment of the present invention, the function performed by the cursor movement device and the cursor depends on the orientation of the cursor on the display. In a further embodiment of the present invention, the width of the swath of a cursor's movement can be controlled by rotating the cursor according to the hypothetical viscous dragging. Accordingly, in operations where the cursor is used as an eraser or writing implement, the width of erasure or writing can be easily controlled with the cursor movement device.

DETAILED DESCRIPTION

While the present invention will hereinafter be described in connection with a preferred method of use, it will be understood that it is not intended to limit the invention to that method of use. On the contrary, it is intended to cover all alternatives, modifications and equivalents as may be included within the spirit and scope of the invention as defined by the appended claims.

Figure 1B:
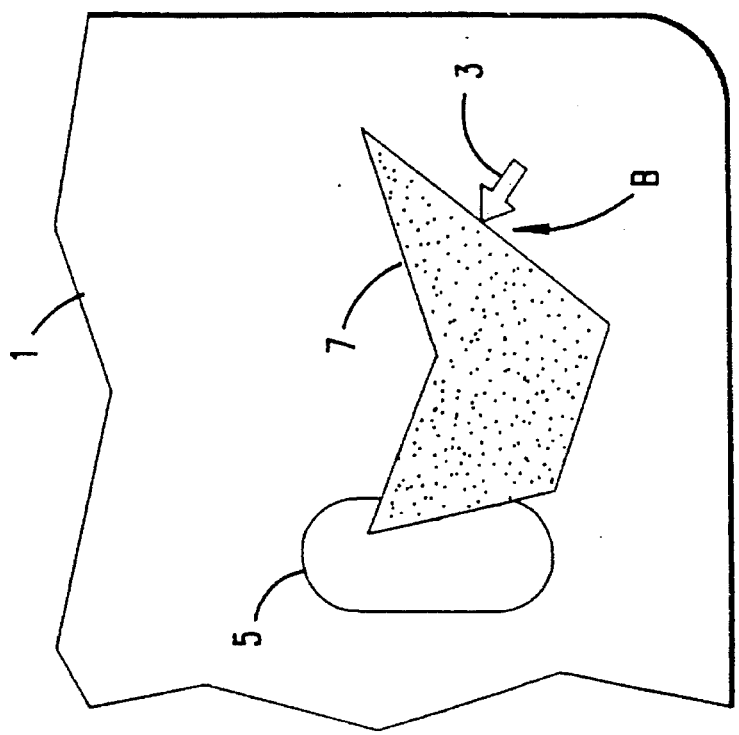
FIG. 1a–b is a screen display of a cursor and graphical objects which are to be moved and rotated.
Figure 1A:
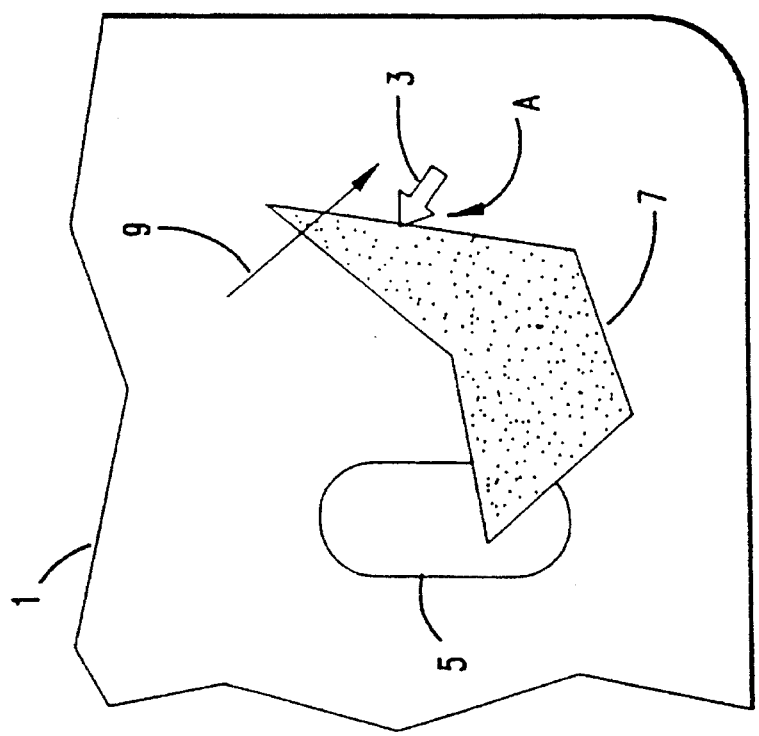

Referring to FIGS. 1a–b, a sample display is shown. This screen display may appear on a cathode ray tube (CRT) device or the like. The screen display 1, includes a cursor 3, a first object 5, and a second object 7. In one move, a user can move the cursor 3 along a path from point A to point B. Normally, the path taken between points A and B is neglected in a computer application. The only processing that occurs is the changing of the stored cursor position to its new location at point B by either storing the new position directly or computing the change in position at several points along the path between A and B.

When moving a cursor between points A and B, the time lapse during the movement can vary (i.e., the cursor can be moved rapidly between the two points or slowly). Therefore, a path between points A and B can be indicated as a function of position and time or P(A, B; t). The method of the present invention utilizes the directional inputs of a cursor movement device with respect to time to perform a hypothetical viscous dragging of the graphical object through an imaginary medium. As seen in FIG. 1a, the cursor 3 is placed at location A on the second object 7. The cursor 3 is then moved in the direction indicated by arrow 9 to the new position, location B, shown in FIG. 1b. The second object 7 not only has been moved in the direction of arrow 9, but has been rotated, as well.

Figure 2:
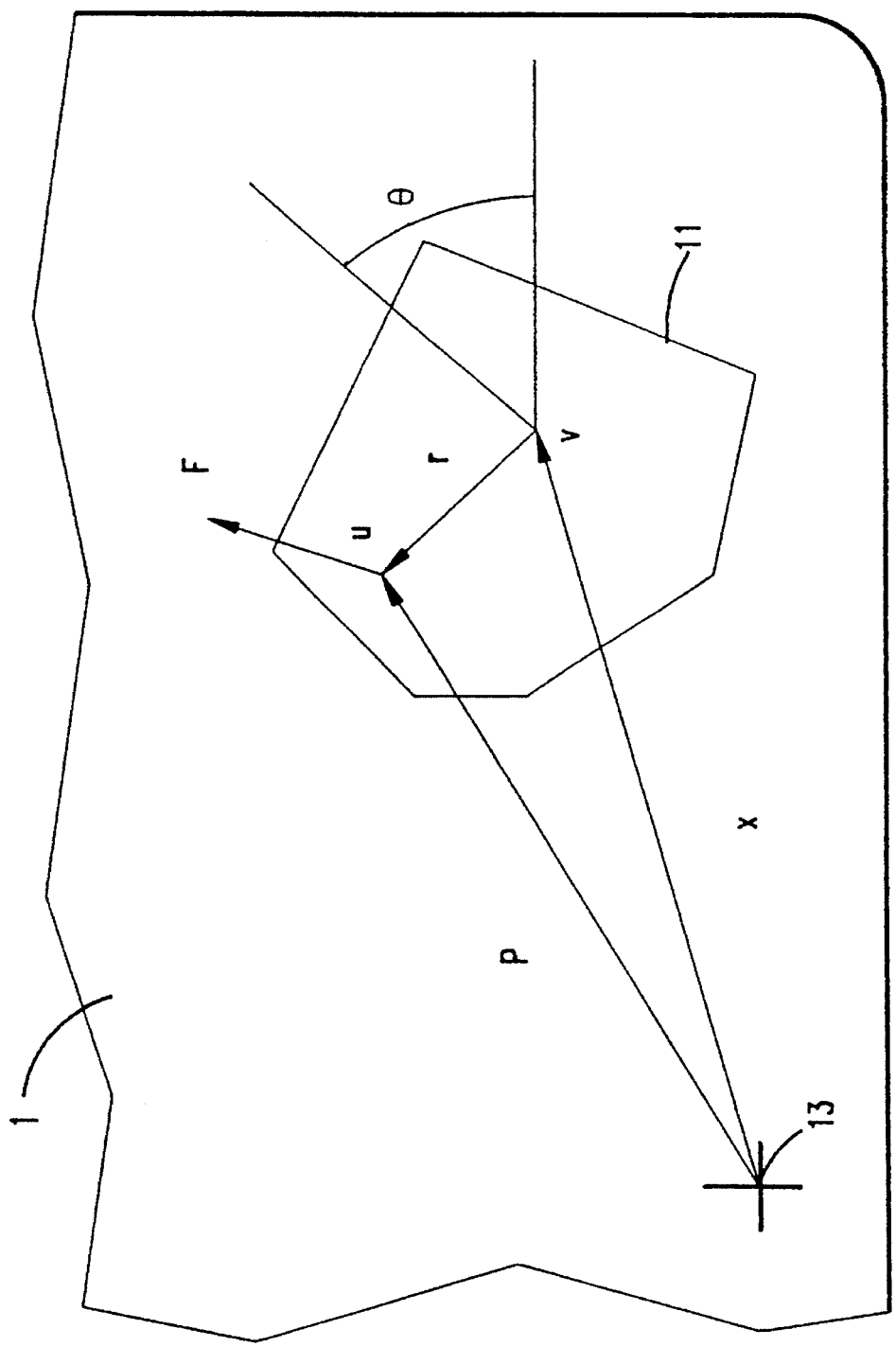
FIG. 2 is a screen display of a cursor and a graphical object and a number of the vectors used in calculating the viscous movement of the object.

Referring to FIG. 2, a graphical object is shown with its associated parameters. In the present invention, the movement of the graphical object 11 is similar to the movement of a solid object in a viscous medium. In one model for viscous damping, a medium will exert a force that is proportional to the velocity of the object but opposite in direction. The variable, b, represents the coefficient of proportionality for this relationship. The force exerted by the medium will also slow the rotation of the object. This model also includes a torque which is proportional to the negative of the angular velocity. The torque has a coefficient of proportionality equal to $bL^2$, where L is a length value representative of the object's extent. In this embodiment L is the distance from the cursor location to the farthest point on the object 11.

In this embodiment, the graphical object 11 is a five-sided two-dimensional polygon. An origin 13 is chosen in the screen area 1, having fixed or variable coordinates. The vector x denotes the distance and direction from the origin 13 to the center of mass (shown here as point v) of the object 11. The vector P denotes the distance and direction from the origin 13 to the point on the object 11 where an imaginary force is being applied (shown here as point u). In this embodiment, the force is applied at the cursor location.

The vector r is equal to P–x which has a constant magnitude while the object 11 is being moved. The vector θ is the angular orientation of the object which points perpendicular to the screen 1 from the object's center of mass v. The vector F denotes the force applied to the object 11 at point u.

Equations 1 and 2 represent the motion of a solid object in a viscous medium under the influence of a force F applied at point u.

$$F - b\frac{dx}{dt} = m\frac{d^2x}{dt^2} \quad \text{(EQ 1)}$$

$$r \times F - bL^2\frac{d\theta}{dt} = I\frac{d^2\theta}{dt^2} \quad \text{(EQ 2)}$$

Variable m represents the mass of the solid object 11 and variable I represents the moment of inertia of the object. As mentioned above, the value for point u is given by a user input, preferably by the location of the cursor. The rate of change of the point u is given in the following equation:

$$\frac{dP}{dt} = \frac{dx}{dt} + \frac{d\theta}{dt} \times (P - x) \quad \text{(EQ 3)}$$

As time advances, the values for the vectors x and θ must be calculated based on the input value for the vector P. In the above equations, there are five unknowns: the magnitude and direction for both the x and F vectors and the magnitude of the θ vector. The variables b, L, I, and m can be calculated or set to a constant.

Solving the above equations is demanding in real time. Therefore, these equations can be approximated to simplify the computations for the computer. Several assumptions are made to simplify the equations. First of all, a "high damping limit" is assumed where the damping factors are very large. Second of all, the force vector F is assumed to vary slowly with respect to time. In equations 4 and 5, changes of variable are made to dimensionless quantities.

$$\tau \equiv \frac{F}{br} t \quad \text{(EQ 4)}$$

$$z \equiv \frac{x}{r} \quad \text{(EQ 5)}$$

Since the force vector F is assumed to change slowly with respect to time, dF/dt=0. Equations 1 and 2 now reduce to Equations 6 and 7, respectively. T,90

The value ε is a dimensionless parameter that reduces to 0 as the damping coefficient b becomes large. $\hat{F}$ and $\hat{r}$ are unit vectors for vectors F and r, respectively. Equations 6 and 7 are term by term dimensionless, and their solutions are the functions z and θ. These functions depend on ε, and therefore can be expanded in ε as a power series as follows: T,91

The parameter ε will be treated as a small perturbation due to a large damping b. Only the lowest order terms are needed. The zero order terms in the θ expansion for z and θ solve as follows: T,92

Only these zero order terms are left in the approximation. Therefore, all effects proportional to ε are discarded. In terms of x and t, the approximation is as follows: T,100

Combining equations 13 and 14 with the position equation 3 results in the following equation: T,101

The right hand side of equation 15 can be written as a matrix multiplied by the force vector F. Such a matrix can be inverted in order to solve for F according to the following function:

$$\left[ \delta_{ij} - \sum_{mkl} \epsilon_{imk}\epsilon_{klj}a_ma_l \right]^{-1} = \frac{\delta_{ij} + a_ia_j}{1 + a^2} \quad \text{(EQ 15a)}$$

Therefore F is computed according to the following equation:

$$F = b\frac{\frac{dP}{dt} + \frac{1}{L^2} r\left( r \cdot \frac{dP}{dt} \right)}{1 + r^2/L^2} \quad \text{(EQ 16)}$$

Additional information on the properties of matrices and Equation 15a can be found in chapter 1 of *Classical Dynamics of Particles and Systems* by J. B. Marion (© 1970, by Academic Press, Inc.). The cross product r×F is equal to the applied torque on the object 11. The cross product of the right-hand side of equation 16 with vector r is therefore equal to the right-hand side of equation 14. Since r×r=0, the equation reduces as follows:

$$r \times F = \frac{br \times \frac{dP}{dt}}{1 + L^2/r^2} = bL^2 \frac{d\theta}{dt} \quad \text{(EQ 17)}$$

or $$\frac{d\theta}{dt} = \frac{r \times \frac{dP}{dt}}{L^2 + r^2}. \quad \text{(EQ 18)}$$

Though easier to compute, equation 18 is still difficult to use in real time. Therefore equation 18 is reduced to define $\Delta\theta$ and $\Delta x$ based on $\Delta P$ from the user input. Using equation 18 and equation 3 and approximating the derivative with respect to time (d/dt) to a simple difference calculation ($\Delta$), the final equations are as follows:

$$\Delta\theta = \frac{r \times \Delta P}{L^2 + r^2} \quad \text{(EQ 19)}$$

$$\Delta x = \Delta P - \vec{\Delta\theta} \times r \quad \text{(EQ 20)}$$

Figure 3:
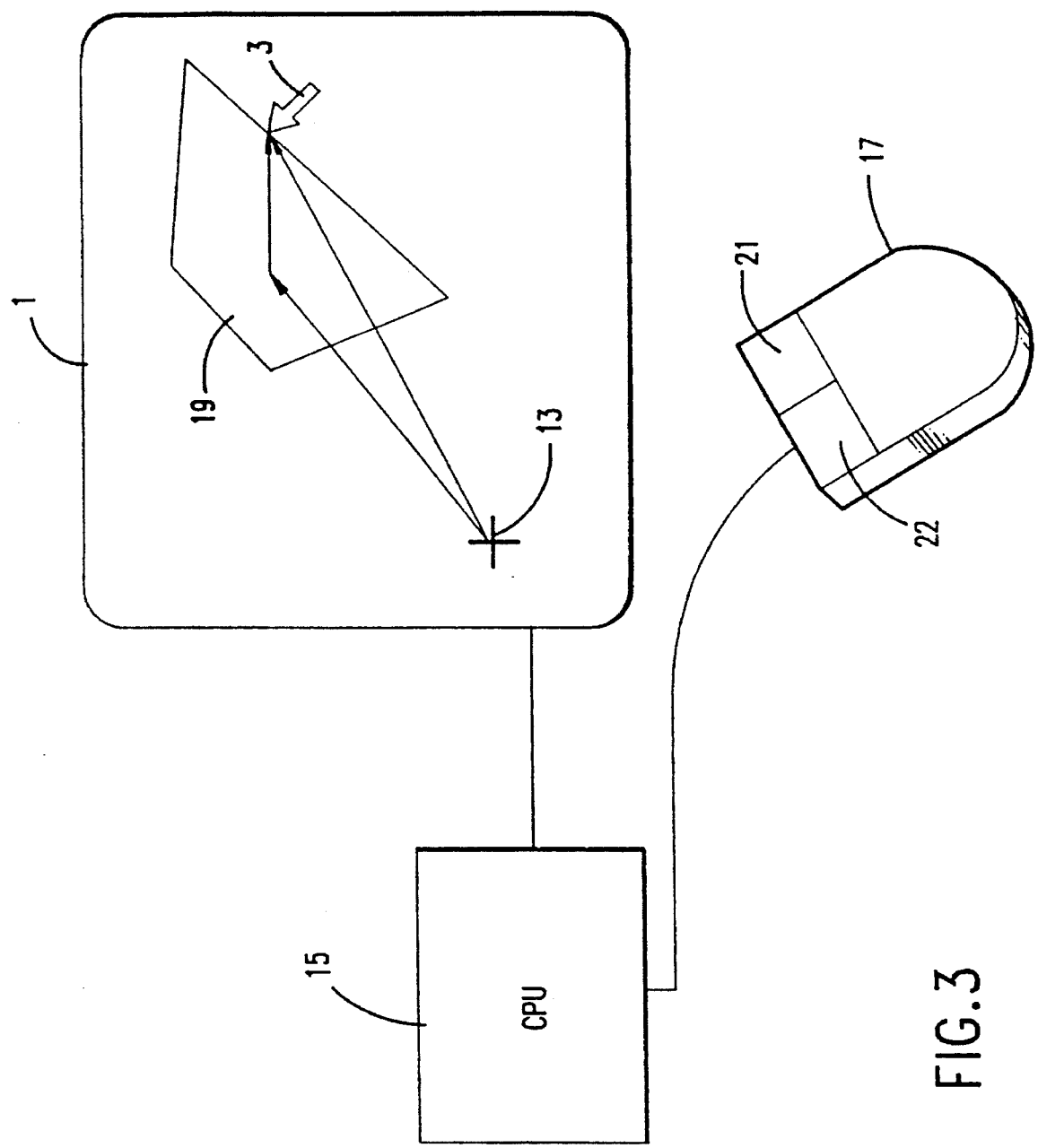
FIG. 3 is diagram of a computer system implementing the method of the present invention.

Referring to FIG. 3, a computer system is shown according to an embodiment of the present invention. The computer system includes a display 1, such as a CRT screen, a central processing unit (CPU) 15, which can be a personal computer, for example, and a cursor movement device, such as a mouse 17, for example. The present invention can be used with a variety of computer systems and input devices. For instance, the mouse 17 can be replaced with a track-ball input device (e.g., the Turbo Mouse® ADB manufactured by Kensington® Microware Ltd.) or a stylus/input sheet combination. In this embodiment, the mouse 17 includes first and second input switches 21 and 22.

Once an object 19 is created on the screen 1, the center of mass is computed with respect to an origin 13, according to a variety of known methods. The cursor location, u, is constantly stored in the CPU 15. The vector r is then easily computed in a known manner by subtracting the vector x (which points from the origin 13 to the center of mass, v) from the vector P (which points from the origin 13 to the cursor location, u). The length variable L, is the only value that has to be modeled in this embodiment.

The screen 1 is divided into a plurality of picture elements, commonly referred to as pixels. Each pixel will have its own unique coordinate pair with respect to the origin 13. Accordingly, the smallest incremental value for |$\Delta P$| will be the distance between adjacent pixels. The values for |$\Delta\theta$| and |$\Delta x$| are computed, repeatedly. Depending on the processing speed of the CPU 15, these values are computed periodically (e.g., once every 50 msec) as the object is moved. Each time these values are computed, the object 19 is redrawn based on the new coordinate values for the center of mass, v, and the new orientation angle, $\theta$. When moving the object 19, the cursor 3 is first placed at a desired starting location by the mouse 17. By pressing one of the input switches, for instance the first switch 21, the CPU 15 initiates the viscous dragging computations described above. As the user moves the cursor 3 while depressing the first switch 21, the object is shifted and rotated on the screen 1.

There are many uses for the present invention. For instance, the cursor 3 can be treated as an object to be shifted and rotated. In such a situation, the center of mass for the cursor 3 would be selected between the tip of the arrow and its distal end (e.g., the center of mass could be selected at the base of the arrow head). The vector P would preferably point to the tip of the arrow head. Viscous dragging of the cursor 3 can be initiated by pressing the second input switch 22, for instance. As the user moves the cursor, its orientation can be adjusted to a desired direction. When the cursor is being used as a writing implement or eraser on the display, it can be easily rotated using the above described method. Therefore, the width of the writing or erasing swath can be easily controlled with the cursor movement device.

Figure 4:
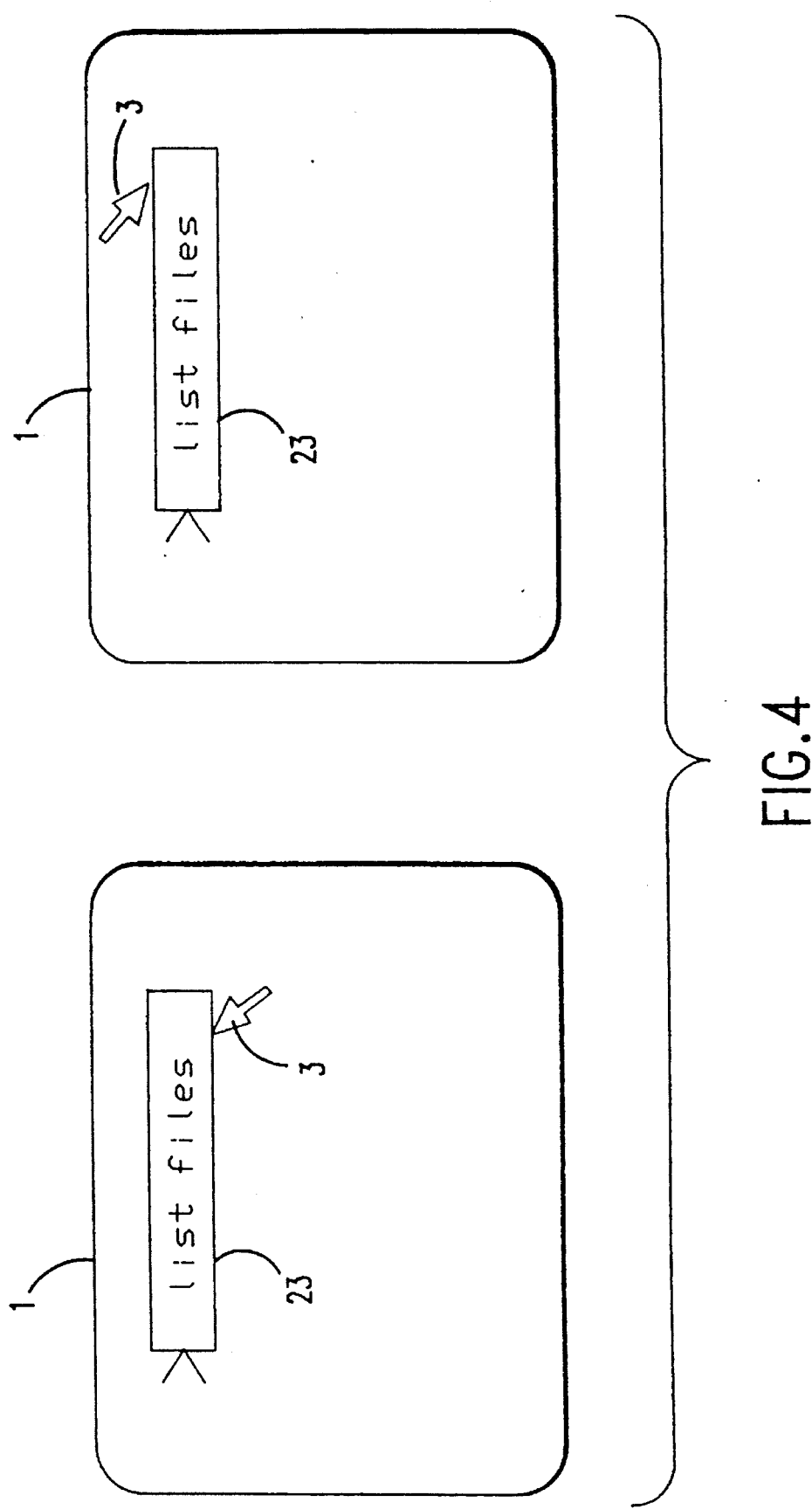
FIG. 4 is a screen display of a cursor and a block of data for an embodiment of the present invention.

The functions performed by the cursor 3 can now be made to depend on its the orientation. An example of this type of function selection is shown in FIG. 4. If the cursor 3 is pointing upward as seen in the image on the left, then only movement operations can be performed on the pixel data in the block 23. For instance, by pressing the first input switch 21, the pixel data appearing in block 23 can now be moved to another location on the screen. If the cursor 3 is pointing downward as seen in the image on the left, then the data within the box 23 is executed or evaluated. In this example, the ASCII data "list files" is executed as a command.

The present invention can also be extended to the movement and rotation of graphical objects in three dimensions. Rather than two directional inputs (as input from the mouse device), three directional inputs are needed. The equations described above can be easily expanded for three dimensional object movement.

What is claimed:

1. In a computer system, a method of controlling movement of an N-dimensional graphical object on a display having a plurality of coordinate values, comprising:

displaying said graphical object at a selected location and orientation on said display;

positioning a cursor at a desired location on said display with a cursor movement device;

moving said cursor along a desired path of motion on said display with said cursor movement device, where said location and path of motion are defined by N variables; and modifying said graphical object on said display, such that said location and orientation of said graphical object are modified in dependance on said desired location and said desired path of motion.

2. The method of claim 1, wherein in said modifying step, said location and orientation of said graphical object are modified according to a hypothetical viscous dragging of the graphical object through an imaginary medium.

3. The method of claim 1, wherein in said modifying step, modifying said location and orientation of said graphical object is simulated to dragging a solid object through a viscous medium.

4. The method of claim 3, wherein before said moving step said method further comprising:

determining center of mass coordinate values for said graphical object, such that said orientation of said graphical object is modified by rotating said graphical object around said center of mass coordinates.

5. The method of claim 4, wherein before said moving step said method further comprising:

determining an extent value of said graphical object; and said maneuvering step comprising:

computing a change in orientation value, $\Delta\theta$, and a change in position value, $\Delta x$, such that $$\Delta\theta = \frac{r \times \Delta P}{L^2 + r^2}$$

-continued and $$\Delta x = \Delta P - \Delta \theta \times r$$

where:
P is a vector from an arbitrary origin to a cursor position on said display;
L is said extent value;
r is a vector from said center of mass of said graphical object to said cursor position on said display;
θ is a vector representing said orientation of said graphical object around said center of mass; and
x is a vector from said origin to said center of mass coordinate values.

6. The method of claim 5, further comprising:
redrawing said graphical object in dependence on said Δθ and Δx values.

7. The method of claim 3 wherein said graphical object is a three-dimensional representation on said display.

8. In a computer system, a method of controlling movement of an N-dimensional cursor on a display having a plurality of coordinate values, comprising:
displaying said cursor at a selected location and orientation on said display;
preselecting a center of mass point on said cursor;
positioning said cursor at a desired location on said display with a cursor movement device;
moving said cursor along a desired path of motion on said display with said cursor movement device, where said location and path of motion are defined by N variables, such that said location and orientation of said cursor are modified in dependance on said preselected center of mass point and said path of motion.

9. The method of claim 8, wherein in said computer system, said cursor movement device and said cursor selectively perform a plurality of functions, such that the function performed by said cursor movement device and said cursor is selected in dependence on said orientation of said cursor.

10. The method of claim 8, wherein in said moving step, said location and orientation of said cursor are modified according to a hypothetical viscous dragging of the graphical object through an imaginary medium.

11. The method of claim 8, wherein in said moving step, modifying said location and orientation of said cursor is simulated to dragging a solid object through a viscous medium.

12. The method of claim 11, wherein in said computer system, said cursor movement device and said cursor selectively perform a plurality of functions, such that the function performed by said cursor movement device and said cursor is selected in dependence on said orientation of said cursor.

13. The method of claim 11, wherein before said moving step said method further comprising:
determining center of mass coordinate values for said cursor, such that said orientation of said graphical object is modified by rotating said cursor around said center of mass coordinates.

14. The method of claim 13, wherein before said moving step said method further comprising:
determining an extent value of said cursor; and said maneuvering step comprising:
computing a change in orientation value, Δθ, and a change in position value, Δx, such that $$\Delta \theta = \frac{r \times \Delta P}{L^2 + r^2}$$

and $$\Delta x = \Delta P - \Delta \theta \times r$$

where:
P is a vector from an arbitrary origin to a coordinate value on said cursor on said display;
L is said extent value;
r is a vector from said center of mass of said cursor to said coordinate value on said cursor on said display;
θ is a vector representing said orientation of said cursor around said center of mass; and
x is a vector from said origin to said center of mass coordinate values.

15. The method of claim 14, further comprising:
redrawing said cursor on said display in dependence on said Δθ and Δx values.

16. The method of claim 15, wherein in said computer system, said cursor movement device and said cursor selectively perform a plurality of functions, such that the function performed by said cursor movement device and said cursor is selected in dependence on said orientation of said cursor.

17. A computer system, comprising:
a central processing unit;
a display having a plurality of coordinate values and coupled to said central processing unit, said display capable of displaying an N-dimensional graphical object at a selected location and orientation of said display; and
a cursor movement device coupled to said central processing unit said cursor movement device controlling positioning of a cursor on said display, said cursor movement device positioning said cursor at a desired location on said graphical object and moving said cursor along a desired path of motion on said display, where said location and path of motion are defined by N variables, such that said location and orientation of said graphical object are modified in dependance on said desired location and said desired path of motion.

18. The computer system of claim 17, wherein said location and orientation of said graphical object are modified in dependence on said path of motion according to a hypothetical viscous dragging of the graphical object through an imaginary medium.

19. The computer system of claim 18 wherein said graphical object is a three-dimensional representation on said display.

20. The computer system of claim 17, wherein said location and orientation of said graphical object are modified in dependence on said path of motion simulated to dragging a solid object through a viscous medium.

21. The computer system of claim 20, wherein said cursor movement device is a mouse device.

22. The computer system of claim 20, wherein said cursor movement device is a track-ball device.

23. The computer system of claim 20, wherein said cursor movement device is a stylus in combination with an information input sheet.

24. The computer system of claim 20, wherein said display is a cathode ray tube screen.

25. The computer system of claim 20, wherein said central processing unit determines center of mass coordinate values for said graphical object, such that said orientation of said graphical object is modified by rotating said graphical object around said center of mass coordinates.

26. The computer system of claim 25, wherein said central processing unit determines an extent value of said graphical object and computes a change in orientation value, $\Delta\theta$, and a change in position value, $\Delta x$, such-that $$\Delta\theta = \frac{r \times \Delta P}{L^2 + r^2}$$

and $$\Delta x = \Delta P - \Delta\theta \times r$$

where:
- P is a vector from an arbitrary origin to a cursor position on said display;
- L is said extent value;
- r is a vector from said center of mass of said graphical object to said cursor position on said display;
- $\theta$ is a vector representing said orientation of said graphical object around said center of mass; and
- x is a vector from said origin to said center of mass coordinate values.

27. The computer system of claim 26 wherein said central processing unit redraws said graphical object on said display in dependence on said $\Delta\theta$ and $\Delta x$ values.

28. A computer system, comprising:
- a central processing unit;
- a display having a plurality of coordinate values and coupled to said central processing unit, said display capable of displaying a cursor at a selected location and orientation of said display; and
- a cursor movement device coupled to said central processing unit said cursor movement device controlling positioning of a N-dimensional cursor on said display, said cursor movement device moving said cursor along a desired path of motion on said display, where said location and path of motion are defined by N variables, such that said location and orientation of said cursor are modified in dependance on a preselected center of mass point on said cursor and said path of motion.

29. The computer system of claim 28, wherein said cursor movement device and said cursor selectively perform a plurality of functions, such that the function performed by said cursor movement device and said cursor is selected in dependence on said orientation of said cursor.

30. The computer system of claim 29, wherein said cursor movement device is a stylus in combination with an information input sheet.

31. The computer system of claim 29, wherein said display is a cathode ray tube screen.

32. The computer system of claim 29, wherein said cursor movement device is a mouse device.

33. The computer system of claim 29, wherein said cursor movement device is a track-ball device.

34. The computer system of claim 28, wherein said location and orientation of said cursor are modified according to a hypothetical viscous dragging of the cursor through an imaginary medium.

35. The computer system of claim 28, wherein said location and orientation of said cursor are modified in dependence on said path of motion simulated to dragging a solid object through a viscous medium.

36. The computer system of claim 35, wherein said cursor movement device and said cursor-selectively perform a plurality of functions, such that the function performed by said cursor movement device and said cursor is selected in dependence on said orientation of said cursor.

37. The computer system of claim 36, wherein said cursor movement device is a mouse device.

38. The computer system of claim 36, wherein said cursor movement device is a track-ball device.

39. The computer system of claim 36, wherein said cursor movement device is a stylus in combination with an information input sheet.

40. The computer system of claim 35, wherein said central processing unit determines center of mass coordinate values for said cursor, such that said orientation of said cursor is modified by rotating said cursor around said center of mass coordinates.

41. The computer system of claim 40, wherein said central processing unit determines an extent value of said cursor and computes a change in orientation value, $\Delta\theta$, and a change in position value, $\Delta x$, such that $$\Delta\theta = \frac{r \times \Delta P}{L^2 + r^2}$$

and $$\Delta x = \Delta P - \Delta\theta \times r$$

where:
- P is a vector from an arbitrary origin to a coordinate value on said cursor on said display;
- L is said extent value;
- r is a vector from said center of mass of said cursor to said coordinate value on said cursor on said display;
- $\theta$ is a vector representing said orientation of said cursor around said center of mass; and
- x is a vector from said origin to said center of mass coordinate values.

42. The computer system of claim 41, wherein said central processing unit redraws on said display cursor in dependence on said $\Delta\theta$ and $\Delta x$ values.

43. The computer system of claim 42, wherein said cursor movement device and said cursor selectively perform a plurality of functions, such that the function performed by said cursor movement device and said cursor is selected in dependence on said orientation of said cursor.

\* \* \* \* \*

UNITED STATES PATENT AND TRADEMARK OFFICE
CERTIFICATE OF CORRECTION

Page 1 of 3

PATENT NO. : 5,471,571
DATED : 28 November 1995
INVENTOR(S) : Randall B. SMITH et al.

It is certified that error appears in the above-indentified patent and that said Letters Patent is hereby corrected as shown below:

| Column | Line | |
|---|---|---|
| 4 | 30 | After "respectively." delete "T,90" and insert |

$$(EQ\ 6) \qquad \dot{F} - \frac{dz}{d\tau} = \varepsilon \frac{d^2 z}{d\tau^2}$$

$$(EQ\ 7) \qquad \hat{r} \times \dot{F} - \frac{L^2}{r^2}\frac{d\vec{\theta}}{d\tau} = \varepsilon \frac{1}{mr^2}\frac{d^2\vec{\theta}}{d\tau^2}$$

where $$(EQ\ 8) \qquad \varepsilon \equiv \frac{mF}{b^2 r}$$

| 4 | 36 | After "follows:" delete "T,91" and insert |

$$(EQ\ 9) \qquad z(\tau,\varepsilon) = \sum_{n=0} z_n(\tau)\varepsilon^n$$

$$(EQ\ 10) \qquad \vec{\theta}(\tau,\varepsilon) = \sum_{n=0} \vec{\theta}_n(\tau)\varepsilon^n$$

UNITED STATES PATENT AND TRADEMARK OFFICE
CERTIFICATE OF CORRECTION

PATENT NO. : 5,471,571
DATED : 28 November 1995
INVENTOR(S) : Randall B. SMITH et al.

It is certified that error appears in the above-indentified patent and that said Letters Patent is hereby corrected as shown below:

4      40      After "follows:" delete "T,92" and insert $$(EQ\ 11) \qquad \vec{F} - \frac{d\vec{z}_0}{d\tau} = 0$$

$$(EQ\ 12) \qquad \vec{r} \times \vec{F} - \frac{d\vec{\theta}_0}{d\tau} = 0$$

4      43      After "follows:" delete "T,100" and insert $$(EQ\ 13) \qquad F = b\frac{dx}{dt}$$

$$(EQ\ 14) \qquad r \times F = bL^2\frac{d\vec{\theta}}{dt}$$

UNITED STATES PATENT AND TRADEMARK OFFICE
CERTIFICATE OF CORRECTION

PATENT NO. : 5,471,571
DATED : 28 November 1995
INVENTOR(S) : Randall B. SMITH et al.

It is certified that error appears in the above-indentified patent and that said Letters Patent is hereby corrected as shown below:

4  45  After "equation:" delete "T,101" and insert (EQ 15)   $\dfrac{dP}{dt} = \dfrac{F}{b} - \dfrac{r \times (r \times F)}{L^2 b}$ Signed and Sealed this Ninth Day of April, 1996

BRUCE LEHMAN

Attesting Officer  Commissioner of Patents and Trademarks